US008761489B2

(12) United States Patent
Rinderknecht et al.

(10) Patent No.: US 8,761,489 B2
(45) Date of Patent: Jun. 24, 2014

(54) METHOD AND APPARATUS FOR CHARACTERIZING DISCONTINUITIES IN SEMICONDUCTOR DEVICES

(75) Inventors: Jochen Rinderknecht, Dresden (DE); Inka Richter, Dresden (DE); Clemens Fitz, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 146 days.

(21) Appl. No.: 13/223,998

(22) Filed: Sep. 1, 2011

(65) Prior Publication Data

US 2013/0058559 A1 Mar. 7, 2013

(51) Int. Cl.
*G06K 9/00* (2006.01)
*G06K 9/68* (2006.01)
*G06K 9/62* (2006.01)

(52) U.S. Cl.
USPC ............................ 382/145; 382/219; 382/224

(58) Field of Classification Search
None
See application file for complete search history.

(56) References Cited

U.S. PATENT DOCUMENTS

| 6,222,936 B1* | 4/2001 | Phan et al. ................... 382/149 |
| 2001/0033683 A1* | 10/2001 | Tanaka et al. ................ 382/149 |
| 2008/0298670 A1* | 12/2008 | Nakagaki et al. ............. 382/149 |
| 2009/0109178 A1* | 4/2009 | Kim et al. ..................... 345/166 |
| 2009/0146183 A1* | 6/2009 | Moon et al. ................... 257/192 |
| 2011/0032348 A1* | 2/2011 | Lim et al. ....................... 348/87 |

OTHER PUBLICATIONS

Dom et al, "Recent advances in the automatic inspection of integrated circuits for pattern defects," 1995, Machine Vision and Applications, vol. 8, pp. 5-19.*
Rodriguez-Montañés et al, "Electrical and Topological Characterization of Interconnect Open Defects," 2005, in Current and Defect Based Testing, 2005. DBT 2005. Proceedings. 2005 IEEE International Workshop on, pp. 1-5.*
Chen, "Metal Silicides: An Integral Part of Microelectronics," 2006, www.tms.org/pubs/journals/jom/0509/chen-0509.html, p. 1.*

* cited by examiner

*Primary Examiner* — Bhavesh Mehta
*Assistant Examiner* — David F Dunphy
(74) *Attorney, Agent, or Firm* — Ditthavong Mori & Steiner, P.C.

(57) ABSTRACT

An approach is provided for characterizing discontinuities in semiconductor devices, for example in a metal silicide. An image of an integrated circuit is caused, at least in part, to be received. The image is analyzed for at least one discontinuity in the integrated circuit structure. A relative measure of the at least one discontinuity is determined in comparison to the integrated circuit structure based on analyzing the image.

18 Claims, 15 Drawing Sheets

METHOD AND APPARATUS FOR CHARACTERIZING DISCONTINUITIES IN SEMICONDUCTOR DEVICES

TECHNICAL FIELD

The present disclosure relates to technology for implementing electronic design automation tools, and in particular, to electronic design automation tools for characterizing discontinuities in semiconductor devices.

BACKGROUND

The use of advanced semiconductor manufacturing processes has enabled the reduction in semiconductor dimensions, and a corresponding increase in device operating speeds. These reductions, however, reduce the available cross-sectional area of interconnect regions, which leads to increased timing delays. To counteract this adverse consequence, various thin-film materials, such as metal silicides, may be formed atop doped polycrystalline silicon interconnects, which reduces the sheet resistivity of the interconnects and, thereby, reduces timing delays.

Conventional self-aligned silicide processes typically involve depositing a thin-film of metal and a protective cap on a semiconductor wafer and annealing to react the deposited metal with underlying silicon at various active regions. This annealing process forms a conductive silicide layer at various active regions. Metal deposited on insulators, such as oxides and nitrides, does not react during the annealing process and, therefore, is etched off (along with the cap) in one or more subsequent stripping operations. Connections may be subsequently formed utilizing one or more processing steps.

One undesirable consequence of these self-aligned silicide processes is the agglomeration of deposited metal during annealing stages, which in turn causes discontinuities. That is, at the elevated temperatures characteristic of annealing processes, and also of later middle of the line (MOL) processing steps, such as the deposition of a high-k dielectric or a metal fill for a replacement gate electrode, silicon within and/or underlying the deposited metal diffuses and eventually coalesces to form silicon grains and holes that break the continuity of the metalized silicide film. Accordingly, a narrow conductor constructed with agglomerated silicide tends to exhibit significant increases in average sheet resistance as the degree to which the metalized silicide film agglomerates and, therefore, causes discontinuities. Contacts formed above the film may punch or even fall through holes in the metalized silicide. Thus, in high speed circuit applications, agglomeration can result in performance degradation and even total functional failure. Accordingly, the adverse consequences of thin-film agglomeration are increasingly becoming one of the main yield detractors for semiconductor devices.

Conventionally, the sheet resistance of metal silicide layers has been measured inline with manufacturing processes to seek out resistivity variances and, thereby, the potential presence and degree of material discontinuities in these layers. Unfortunately, sheet resistance is influenced by many parameters, and therefore, electrical measurements of sheet resistivity do not directly quantify the presence or degree of these discontinuities.

A need, therefore, exists for methodology enabling efficient and accurate determination and monitoring of the effects of discontinuities during, or at least inline with, one or more semiconductor manufacturing processes. There exists a particular need for methodology enabling the characterization of thin-film discontinuities to facilitate the implementation of at least one countermeasure configured to increase the yield of semiconductor devices.

SUMMARY

An aspect of the present disclosure is a method for characterizing discontinuities in semiconductor devices.

Another aspect of the present disclosure is an apparatus for characterizing discontinuities in semiconductor devices.

Yet another aspect of the present disclosure is a method for monitoring development of discontinuities in semiconductor devices.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: causing, at least in part, an image of an integrated circuit structure to be received, analyzing the image for at least one discontinuity in the integrated circuit structure, and determining a relative measure of the at least one discontinuity in comparison to the integrated circuit structure based on analyzing the image.

Aspects of the present disclosure include causing, at least in part, the image to be generated inline with one or more manufacturing processes utilized to fabricate at least a portion of the integrated circuit structure. Another aspect includes causing, at least in part, the image to be generated by causing, at least in part, the integrated circuit structure to be imaged with a scanning electron microscope. Other aspects include: pixelating the image with a plurality of pixels, determining a number of pixels associated with the integrated circuit structure, and determining a number of pixels associated with the at least one discontinuity, wherein the relative measure includes a fractional comparison between the number of pixels associated with the at least one discontinuity and the number of pixels associated with the integrated circuit structure. Additional aspects include the plurality of pixels being vector-defined based on one or more monochromatic or grayscale thresholds. Further aspects include: determining whether the relative measure violates at least one design threshold associated with yield and/or electrical performance, and generating an alert if the relative measure violates at least one of the at least one design threshold. Other aspects include: causing, at least in part, a second image of the integrated circuit structure to be received, analyzing the second image for the at least one discontinuity, determining a second relative measure of the at least one discontinuity in comparison with the integrated circuit structure based on analyzing the second image, and monitoring the at least one discontinuity based on the relative measure and the second relative measure. Another aspect includes the image and the second image are respectively associated with a first manufactured state and a second manufactured state of the integrated circuit structure, the method further including: causing, at least in part, the image and the second image to be respectively stored in association with the first manufactured state and the second manufactured state. An additional aspect includes the integrated circuit structure being one of a plurality of integrated circuit structures included as part of an integrated circuit device, the method further including: analyzing the relative measure in conjunction with a plurality of other relative measures associated with the integrated circuit device, and determining a relative measure distribution across the integrated circuit device.

Another aspect of the present disclosure is an apparatus including: at least one processor, and at least one memory including computer program code, the at least one memory and the computer program code configured to, with the at least one processor, cause the apparatus to: receive an image of an integrated circuit structure, analyze the image for at least one discontinuity in the integrated circuit structure, and determine a relative measure of the at least one discontinuity in comparison with the integrated circuit structure based on analyzing the image.

Aspects of the present disclosure include the apparatus being at least further caused to: cause, at least in part, the image to be generated inline with one or more manufacturing processes utilized to fabricate at least a portion of the integrated circuit structure. Another aspect includes the apparatus being further caused to: cause, at least in part, the integrated circuit structure to be imaged with a scanning electron microscope. Other aspects include the apparatus being further caused to: pixelate the image with a plurality of pixels, determine a number of pixels associated with the integrated circuit structure, and determine a number of pixels associated with the at least one discontinuity, wherein the relative measure includes a fractional comparison between the number of pixels associated with the at least one discontinuity and the number of pixels associated with the integrated circuit structure. Additional aspects include the plurality of pixels being vector-defined based on one or more monochromatic or grayscale thresholds. Further aspects include the apparatus being at least further caused to: determine whether the relative measure violates at least one design threshold associated with yield and/or electrical performance, and generate an alert if the relative measure violates at least one of the at least one design threshold. Other aspects include the apparatus being further caused to: receive a second image of the integrated circuit structure, analyze the second image for the at least one discontinuity, determine a second relative measure of the at least one discontinuity in comparison with the integrated circuit structure based on analyzing the second image, and monitor the at least one discontinuity based on the relative measure and the second relative measure. Another aspect includes the image and the second image being respectively associated with a first manufactured state and a second manufactured state of the integrated circuit structure, the apparatus being further caused to: store the image and the second image in respective association with the first manufactured state and the second manufactured state. An additional aspect includes the integrated circuit structure being one of a plurality of integrated circuit structures included as part of an integrated circuit device, the apparatus being further caused to: analyze the relative measure in conjunction with a plurality of other relative measures associated with the integrated circuit device, and determine a relative measure distribution across the integrated circuit device.

Another aspect of the present disclosure is a method including: causing, at least in part, a plurality of images of an integrated circuit structure to be received, the plurality of images being respectively associated with a plurality of manufactured states of the integrated circuit structure, analyzing the plurality of images for at least one discontinuity in the integrated circuit structure, determining a plurality of relative measures of the at least one discontinuity in comparison with the integrated circuit structure based on analyzing the plurality of images, and monitoring development of the at least one discontinuity based on the plurality of relative measures.

Aspects of the present disclosure include: determining whether any of the plurality of relative measures violates at least one design threshold associated with yield and/or electrical performance, and generating an alert if at least one of the plurality of relative measures violates at least one of the at least one design threshold.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves a problem of characterizing and monitoring discontinuities, such as from agglomeration, associated with fabricating, for example, thin-film metal silicide. In accordance with embodiments of the present disclosure, the characterization and/or monitoring of discontinuities may occur during, or at least inline with, one or more manufacturing processes for fabricating thin-film metal silicide. Additional embodiments of the present disclosure enable the discontinuities to be analyzed, verified against thresholds, and correspondingly addressed to avert the adverse consequences associated with discontinuities or at least ensure that future semiconductor devices are not fabricated with such discontinuities.

Methodology in accordance with embodiments of the present disclosure includes: causing, at least in part, an image of an integrated circuit structure to be received, analyzing the image for at least one discontinuity in the integrated circuit structure, and determining a relative measure of the at least one discontinuity in comparison to the integrated circuit structure based on analyzing the image.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
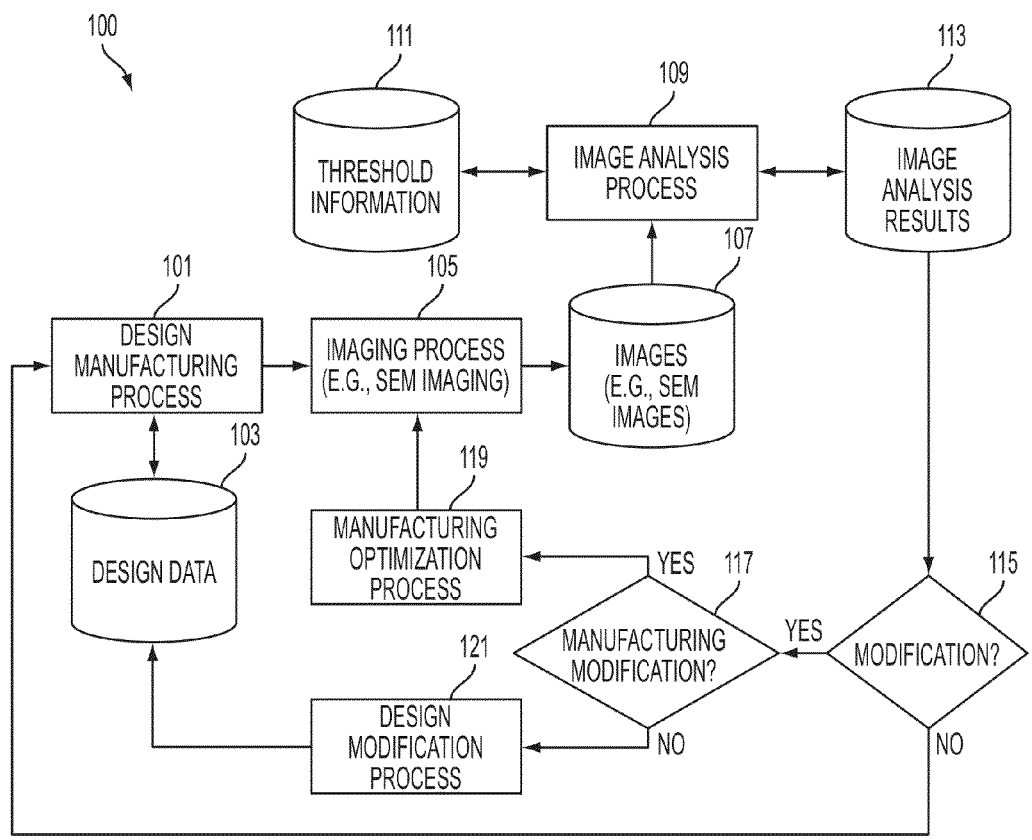
FIG. 1 schematically illustrates an overall process flow for characterizing, monitoring, and responding to discontinuities in semiconductor devices, according to an exemplary embodiment.

FIG. 1 schematically illustrates an overall process flow for characterizing, monitoring, and responding to discontinuities in semiconductor devices, according to an exemplary embodiment. Although various exemplary embodiments are described with respect to discontinuities caused by agglomeration in thin-film metal silicide, it is contemplated that they are applicable to other discontinuities. In accordance with exemplary embodiments, the characterization and/or monitoring of discontinuities may occur during (or at least inline with) one or more design manufacturing processes, such as design manufacturing processes 101. Processes 101 may be performed based on design data stored to, for instance, design data repository 103. For example, design data stored to repository 103 may be utilized to fabricate thin-film metal silicide as part of a semiconductor device, such as a transistor, e.g., a metal-oxide-semiconductor (MOS) transistor. Exemplary formation of thin-film metal silicide is described in more detail in association with FIGS. 2A and 2B.

Figure 2A:
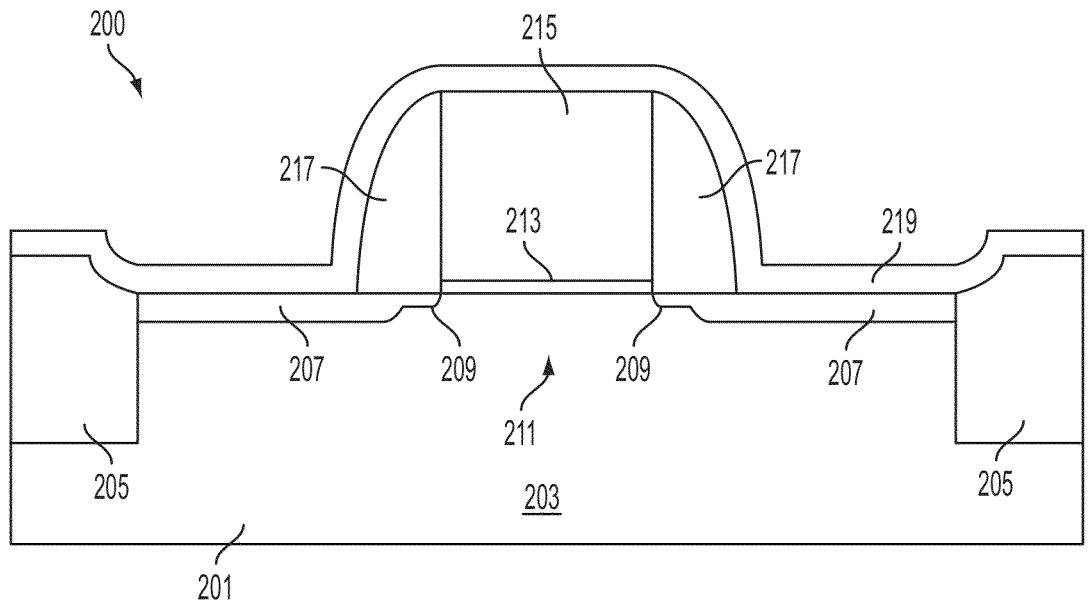
FIGS. 2A and 2B schematically illustrate the formation of thin-film metal silicide, according to various exemplary embodiments.
Figure 2B:
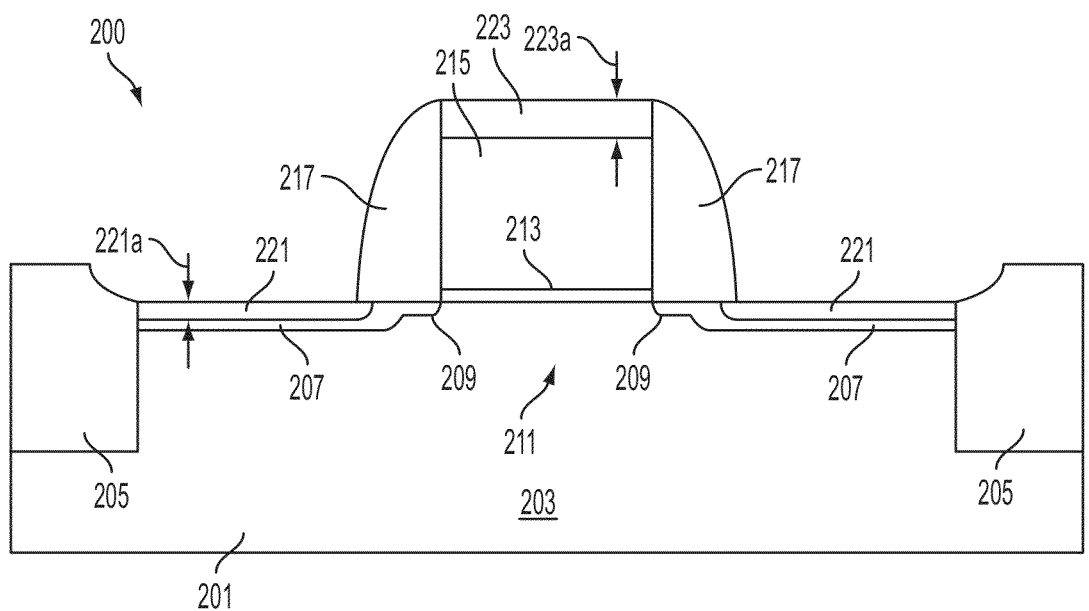

FIGS. 2A and 2B schematically illustrate the formation of thin-film metal silicide, according to various exemplary embodiments. For the purposes of illustration, the formation of thin-film metal silicide is described with respect to a cross-sectional view of semiconductor device 200, such as a transistor, e.g., a MOS transistor, formed on substrate 201 by a series of manufacturing processes including, for example, deposition, photolithography, etching, and implantation. Semiconductor device 200 includes at least one region 203 containing silicon formed in substrate 201. Region 203 is surrounded by shallow trench isolation (STI) region 205. Highly doped source/drain regions 207 including extension portions 209 are formed in region 203. Channel region 211 laterally separates source/drain regions 207. Gate insulation layer 213 physically and electrically isolates gate electrode 215 from underlying channel region 211. Spacer elements 217 are formed on respective sidewalls of gate electrode 215. Refractory metal layer 219 is formed over device 200 with a thickness sufficient for forming thin-film metal silicide portions. Refractory metal layer 219 may be deposited on device 200 via, for instance, one or more formation techniques, such as chemical vapor deposition (CVD) or physical vapor deposition (PVD).

A refractory metal such as nickel, titanium, cobalt, and the like, may be used for metal layer 219. However, the electrical properties of a thin-film of titanium silicide can be strongly dependent on the dimensions of device 200. Furthermore, titanium silicide tends to agglomerate at grain boundaries of polysilicon, and therefore, may significantly increase local, average, and/or total sheet resistivity, which is further pronounced as feature sizes decrease. As such, titanium silicide may not be an acceptable refractory metal for polysilicon lines, such as, for example, gate electrode 215. It would, therefore, be advantageous to be able to characterize, monitor, and/or respond to the agglomeration of such metal silicide in those semiconductor designs utilizing titanium as refractory metal layer 219.

Cobalt does not substantially exhibit a tendency for blocking grain boundaries of the polysilicon; however, further reductions of feature size may require a metal silicide exhibiting significantly lower sheet resistance than cobalt silicide. For instance, in typical self-aligned MOS process flows, metal silicide is formed simultaneously on gate electrode 215 and on source/drain regions 207. For reduced feature sizes, a vertical extension or depth of source/drain regions 207 into active region 203 should be reduced to suppress short-channel effects. However, a metal silicide region formed on gate electrode 215 may require a large vertical extension in view of decreasing gate resistance. Therefore, for highly sophisticated semiconductor devices, nickel is increasingly being considered an appropriate substitute for cobalt, as nickel silicide (NiSi) exhibits significantly lower sheet resistivity compared to cobalt silicide.

Nickel silicide is commonly doped with platinum to improve its material and electrical properties. Platinum has proven to be effective in preventing nickel disilicide ($NiSi_2$) formation. Strategic platinum doping can also be used to effectively shield a NiSi layer from physical damage during MOL processing (post NiSi processing) while concomitantly maintaining NiSi integrity. Platinum, however, also increases the resistivity of NiSi. Accordingly, refractory metal layer 219 will be assumed, hereinafter, to substantially include nickel with the possible addition of platinum. However, characterizing, monitoring, and/or responding to the development of discontinuities in association with the fabrication of cobalt silicide, titanium silicide, and/or any other thin-film metal silicide, may also be advantageous.

After deposition of refractory metal layer 219, one or more heat treatment processing steps are performed to initiate a chemical reaction between the refractory metal atoms and the silicon atoms in the areas of source/drain regions 207 and gate electrode 215 that are in contact with refractory metal layer 219. For instance, one or more rapid thermal anneal cycles may be performed with temperatures in the range of approximately 0 to 600° C., such as 100 to 500° C., e.g., 200 to 400° C., for approximately 0 to 90 seconds, such as 10 to 80 seconds, e.g., 30 to 60 seconds. During such heat treatments, the silicon and refractory metal atoms diffuse and combine to form metal silicide, such as NiSi. It is also during such heat treatments that discontinuities may form in the metal silicide. In addition, discontinuities may form during later high temperature processing steps, such as during MOL processing steps. In accordance with exemplary embodiments, characterization and monitoring of such discontinuities may occur during (or at least inline with) one or more manufacturing steps or states of fabrication, which are described in more detail below.

As seen in FIG. 2B, device 200 includes corresponding thin-film metal silicide regions 221, such as NiSi regions, formed in source/drain regions 207, and thin-film metal silicide region 223, such as another NiSi region, formed in gate electrode 215. Respective thicknesses 221a and 223a of regions 221 and 223 may be adjusted based on varying one or more processing parameters, such as a thickness of an initial refractory metal layer 219 and/or one or more conditions during heat treatments. Non-reacted refractory metal, such as over spacer elements 217 and STI regions 205, may be selectively removed via any suitable selective removal-based processing step, such as at least one wet etch-based processing step. Moreover, thin-film NiSi regions 221 and 223 may be additionally (or alternatively) formed via one or more multi-step rapid anneal cycles with non-reacted refractory metal being selectively removed between cycles. Characterization and monitoring may be employed inline before, between, and/or after these cycles, as well as before, between, and/or after one or more of the other aforementioned manufacturing steps or states.

Although thickness 221a may differ from thickness 223a, due to different diffusive behaviors of the highly doped crystalline silicon of source/drain regions 207 and the doped polysilicon of gate electrode region 215, both thicknesses may be correlated as they may not be adjusted independently from each other without considerably affecting the entire process flow. Therefore, a maximum for thickness 223a of metal silicide on gate electrode 215 is determined by (or at least correlated to) a maximum allowable thickness for thickness 221a that, in turn, is bounded (or restricted) by a depth of corresponding source/drain regions 207. Despite NiSi exhibiting significantly lower sheet resistance than, for instance, cobalt silicide, NiSi is thermally unstable at temperatures exceeding approximately 400° C. and converts to $NiSi_2$, having a higher resistivity than NiSi, at elevated temperatures exceeding approximately 400° C. without the addition of platinum. However, as previously discussed, platinum also increases resistivity. Moreover, the ongoing chemical reaction during $NiSi_2$ formation consumes more silicon, and thus, increases the thickness of the corresponding metal silicide regions. Furthermore, discontinuities from agglomeration of NiSi, as well as the development of one or more other discontinuities, may be of concern and, therefore, overall process 100 may be employed to characterize and monitor these various discontinuities.

Consequently, precise control of the entire NiSi formation process is particularly critical for highly scaled semiconductor devices, such as highly scaled transistor elements. Namely, each of the individual steps, such as the cleaning step(s) prior to refractory metal deposition, the actual deposition step(s), the heat treatment step(s), the selective removal of excess metal silicide steps, and the additional heat treatment step(s), may require precise control and monitoring to maintain and avert the variance and/or degradation (e.g., from discontinuities) of formed metal silicide within tightly set tolerances, which is and increasingly become difficult and complex tasks. Thus, characterizing and monitoring these discontinuities, as well as the processing steps and associated processing parameters may be achieved via overall process 100.

Returning to FIG. 1, overall process flow 100 includes one or more imaging processes 105, such as one or more scanning electron microscope (SEM) imaging processes, for controlling, monitoring, and characterizing the variance and/or degradation of thin-film metal silicide formed as part of one or more semiconductor devices. It is contemplated, however, that any number of other (or additional) imaging processes may be employed, such as scanning transmission electron microscopy (STEM), transmission electron microscopy (TEM), energy dispersive x-ray (EDX) spectroscopy, electron energy loss spectroscopy (EELS), scanning acoustic microscopy (SAM), tomographic acoustic micro-imaging (TAMI), etc. Imaging processes 105 may be implemented during (or at least inline with) one or more design manufacturing processes 101, such that the characterization, monitoring, and addressing of one or more discontinuities may be achieved as those discontinuities develop during fabrication. An exemplary SEM image of a partially fabricated semiconductor device including potentially agglomerated thin-film metal silicide is described in more detail in association with FIG. 3.

Figure 3:
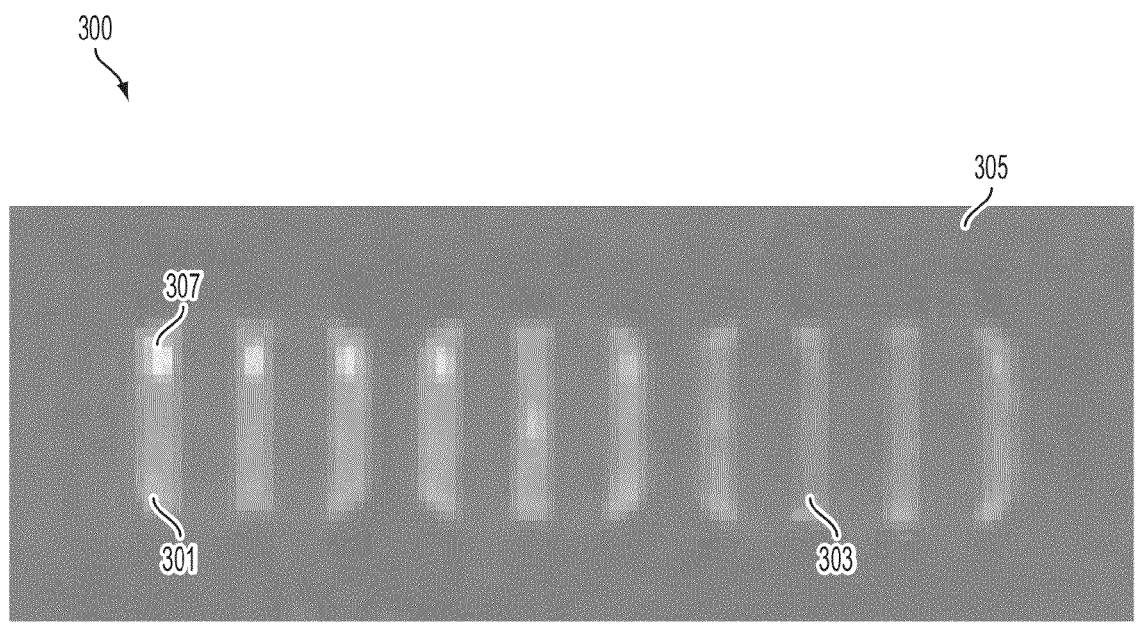
FIG. 3 schematically illustrates a scanning electron microscope image of agglomerated metal silicide, according to an exemplary embodiment.

FIG. 3 schematically illustrates a SEM image of an integrated circuit structure including at least one potential discontinuity, according to an exemplary embodiment. As shown, image 300 has been acquired via, for instance, SEM imaging of an integrated circuit structure inline with one or more manufacturing processes. For example, image 300 may have been generated post heat treatment (e.g., annealing) of one or more deposited refractory metals, i.e., post formation of one or more thin-film metal silicide regions. In this manner, image 300 includes a plurality of metal silicide IC structures, such as IC structures 301 and 303, formed on substrate 305 of a semiconductor device. As previously described in association with FIGS. 2A and 2B, heat treatment of deposited refractory metals can develop one or more discontinuities, such as from agglomerated metal silicide at grain boundaries with polysilicon material. Accordingly, IC structure 301 includes discontinuity 307, whereas IC structure 303 does not include any discontinuities. It is desirable to be able to characterize, monitor, and avert (if possible) the undesirable effects associated with formed discontinuities. An exemplary process for causing, at least in part, one or more images to be generated is described in more detail in association with FIG. 4.

Figure 4:
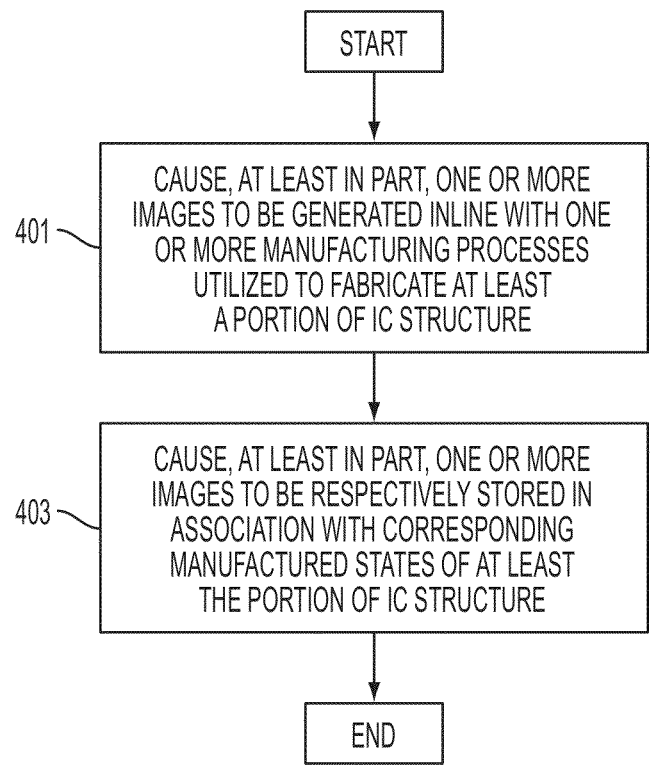
FIG. 4 is a flowchart of a process for generating one or more image-based representations of a potentially agglomerated integrated circuit structure, according to an exemplary embodiment.

FIG. 4 is a flowchart of a process for generating one or more image-based representations of a potentially agglomerated integrated circuit structure, according to an exemplary embodiment. For illustrative purposes, the process is described with reference to FIGS. 1 and 3. At step 401, one or more images are caused, at least in part, to be generated inline with one or more manufacturing processes utilized to fabricate at least a portion of an IC structure. For instance, during at least one stage of fabrication of the IC structure via design manufacture process 101, one or more SEM images (e.g., SEM image 300) may be caused, at least in part, to be generated, such as post heat treatment (e.g., annealing) processes utilized to form one or more thin-film metal silicide regions. In step 403, one or more images are caused, at least in part, to be respectively stored in association with corresponding manufactured states of the portion of the IC structure to, for example, images repository 107.

The analysis of generated images can provide insight into the characterization and monitoring of the development of one or more discontinuities inline with the fabrication of the semiconductor devices. Returning to FIG. 1, overall process flow includes image analysis process 109 for determining the existence of and extent to which one or more discontinuities have developed, as well as monitoring such development. Image analysis process 109 may be configured to determine one or more relative measures (e.g., area fractions) of discontinuities in comparison with the IC structures of semiconductor devices including such discontinuities. Images stored to, for instance, images repository 107 may be converted into image-based mathematical presentations (or representations) that may be manipulated in association with process 109 to identify, characterize, and/or monitor the development of discontinuities. For instance, the images may be converted into one or more pixelated matrices. The identification, characterization, and monitoring of discontinuities may be achieved (or facilitated) via one or more image-based processing techniques, such as thresholding or image segmenting. As such, threshold information (or other image processing information) stored to, for instance, threshold information repository 111 may be utilized by image analysis process 109 to process and analyze images stored to repository 107. An exemplary conversion between an image and an image-based representation of at least one discontinuity is described in more detail in association with FIG. 5. Exemplary processes for determining relative measures and analyzing the image-based representations are described in more detail with FIGS. 6 through 8.

Figure 5:
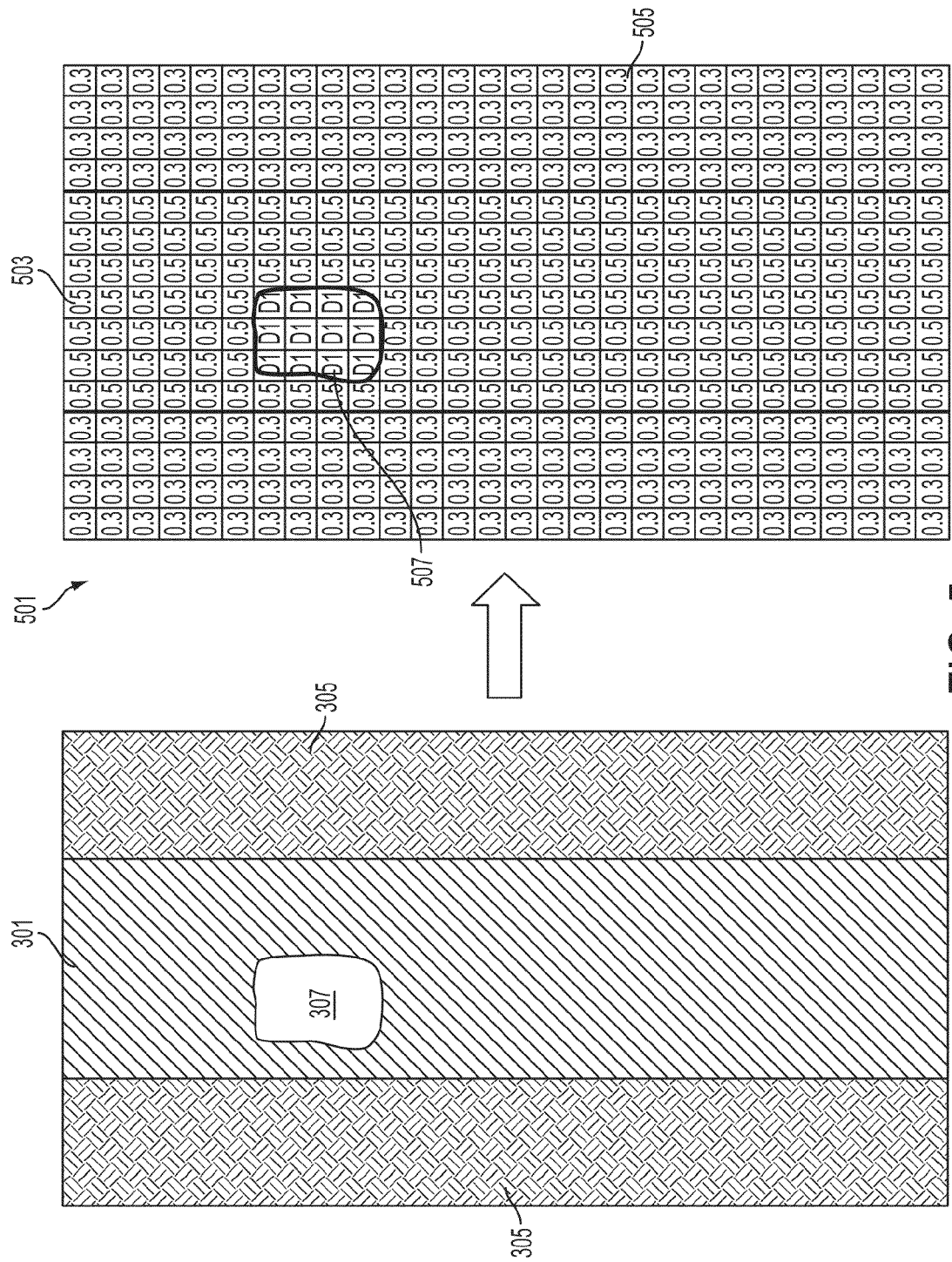
FIG. 5 schematically illustrates the manipulation of an image-based representation of at least one discontinuity for facilitating relative measure determinations, according to an exemplary embodiment.

FIG. 5 schematically illustrates the manipulation of an image-based representation of at least one discontinuity for facilitating relative measure determinations, according to an exemplary embodiment. Utilizing SEM image 300 of FIG. 3 as an example, IC structure 301 may be pixelated (or digitized) as a pixelated matrix with each pixel of the matrix being represented as a vector defined by, for example, a monochromatic (or grayscale) intensity between 0 and 1, with 0 equating to, for instance, black and 1 equating to, for example, white. Although the granularity (or resolution) of the matrix in FIG. 5 is quite coarse for illustrative purposes, any suitable granularity may be utilized for capturing and accounting for the various subtleties of the physical IC structures and/or the discontinuities included therein. One or more additional indicators may be utilized and/or appended to vector values to convey pixels associated with discontinuous regions. For instance, IC structure 301 may be represented as pixilated matrix 501 including a plurality of pixels, such as vector-defined pixels 503 through 507. In this manner, vector-defined pixels like pixel 503 may relate to portions of SEM image 300 corresponding to at least a portion of an IC structure, whereas vector-defined pixels like pixel 505 may relate to portions of SEM image 300 not corresponding to at least a portion of an IC structure, such as portions relating to substrate 305. Vector-defined pixels, such as pixel 507, may be utilized in conjunction with one or more other vector defined pixels to convey discontinuity 307 of IC structure 301. In one embodiment, threshold information may be utilized to categorize pixels as representing certain elements, such as representing a portion of an IC structure, substrate, discontinuity, etc. This exemplary pixel-based representation is straightforward and easily analyzed for characterizing and monitoring various portions of IC structures including at least one discontinuity.

Figure 6:
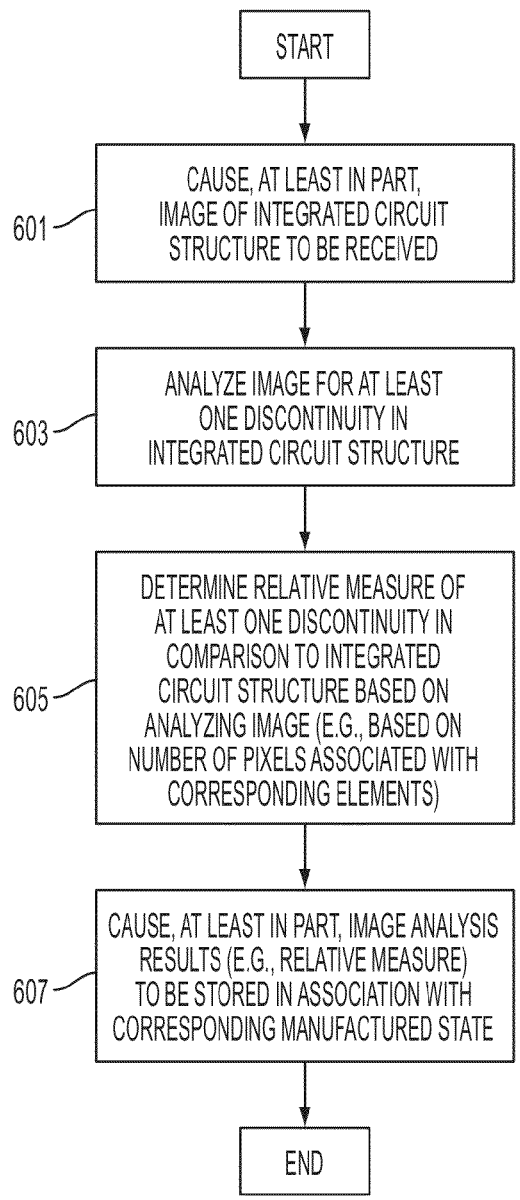
FIG. 6 is a flowchart of a process for determining a relative measure of at least one discontinuity in comparison to an integrated circuit structure at a particular manufactured state, according to an exemplary embodiment.

FIG. 6 is a flowchart of a process for determining a relative measure of at least one discontinuity in comparison with an integrated circuit structure at a particular manufactured state, according to an exemplary embodiment. For illustrative purposes, the process is described with reference to FIGS. 1, 3, and 5, as well as FIG. 8, which is described in more detail below. Further, the steps of the process may be performed in any suitable order, as well as combined or separated in any suitable manner. At step 601, an image of an IC structure is caused, at least in part, to be received (or retrieved). For instance, image analysis process 109 may be caused, at least in part, to receive an image (e.g., SEM image 300) of at least one IC structure (e.g., structure 301) from, for example, images repository 107. In step 603, the image is analyzed for at least one discontinuity in the IC structure. Analyzing the image may include pixilating the image into a pixilated matrix, such as matrix 501, and determining a number of pixels associated with an IC structure and a number of pixels associated with the at least one discontinuity.

Figure 7:
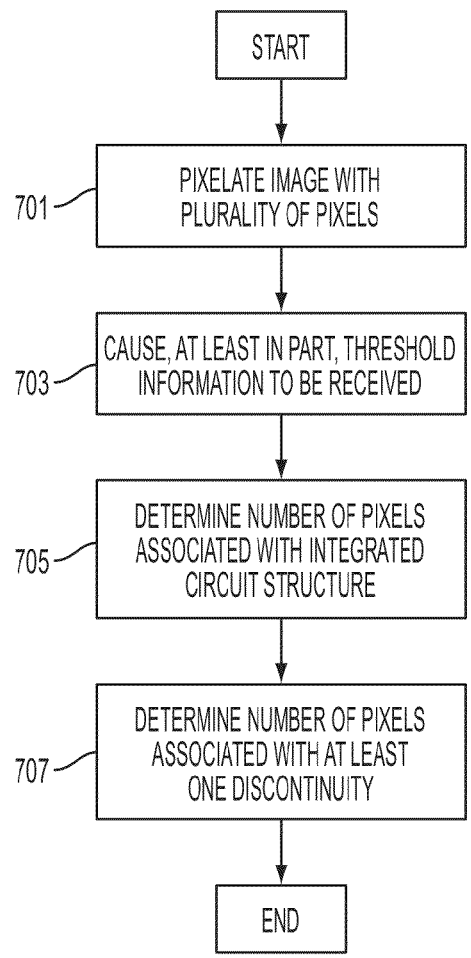
FIG. 7 is a flowchart of a process for analyzing an image for facilitating the determination of relative measures, according to an exemplary embodiment.

Adverting to FIG. 7, there is shown a flowchart of a process for analyzing an image for facilitating the determination of relative measures, according to an exemplary embodiment. For illustrative purposes, the process is described with reference to FIGS. 1, 3, and 5. Further, the steps of the process may be performed in any suitable order, as well as combined or separated in any suitable manner. At step 701, an image is pixelated with a plurality of pixels. For instance, image 300 may be pixelated, via image analysis process 109, as pixilated matrix 501. To differentiate between those portions of an image corresponding to an IC structure or substrate and those portions of the image corresponding to a discontinuity, one or more image processing techniques may be utilized to facilitate the quantitative analysis or description of the various constituent elements of the image. According to one embodiment, the grayscale intensities of the various vector defined pixels of pixelated matrix 501 may be utilized to distinguish between constituent elements. For instance, vector intensities of a first threshold (or threshold range) may correspond to an IC structure element, whereas vector intensities of a second threshold (or threshold range) may relate to substrate elements of a semiconductor design, and vector intensities of a third threshold (or threshold range) may be associated with discontinuous metal silicide. The threshold information defining these various vector intensity threshold values (or ranges of values) may be received (or retrieved) from, for example, threshold information repository 111, per step 703. Utilizing pixelated matrix 501 as an example, threshold intensity values between 0 and 0.3 may relate to substrate elements, whereas IC structure elements may correspond to threshold intensity values between 0.3 and 0.5, and discontinuities may be associated with threshold values between 0.5 and 1. Accordingly, the various constituent elements of pixelated matrix 501 may be categorized so that, in step 705, a number of pixels associated with an IC structure may be determined. In the example of pixelated matrix 501, 196 pixels relate to IC structure 301. At step 707, a number of pixels corresponding to at least one discontinuity may be determined. For instance, 12 pixels relate to discontinuity 307 in pixelated matrix 501.

Figure 8:
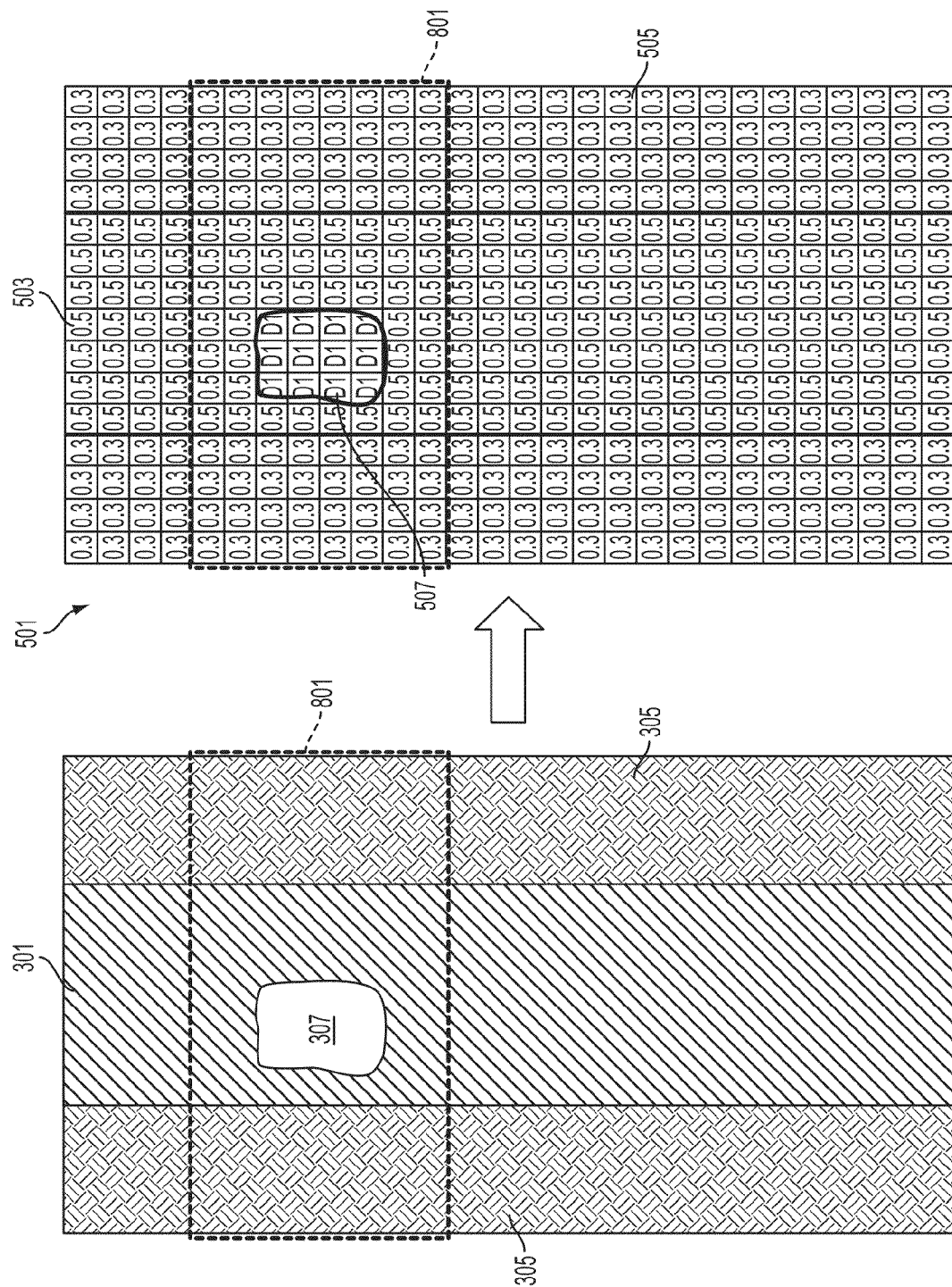
FIG. 8 schematically illustrates a localization region for facilitating relative measure determinations, according to an exemplary embodiment.

Returning to FIG. 6, a relative measure of the at least one discontinuity is determined, per step 605, in comparison with the IC structure based on analyzing the image, such as the analysis of FIG. 7. For instance, the relative measure may be determined based on an association between the number of pixels corresponding to an IC structure and the number of pixels relating to the at least one discontinuity included in the IC structure. Equation (1) may be utilized for defining a relative measure and may be defined as follows:

$$RM = \frac{P_D}{P_{ICS}} \qquad \text{Eq. (1)}$$

where:
RM=Relative Measure
$P_D$=Number of Pixels Associated with Discontinuity
$P_{ICS}$=Number of Pixels Associated with IC Structure According to other exemplary embodiments, additional (or alternative) relative measures may be determined. For instance, the relative measure may be determined for at least one discontinuity, relative to a region of interest, to provide information associated with localized performance variations (e.g., resistivity bottlenecks) caused, at least in part, by the presence of at least one discontinuity. As seen in FIG. 8, there is shown localization region (or region of interest) 801 from which a relative measure may be determined. In this example, the number of pixels relating to IC structure 301 in region of interest 801 may be determined, per step 705, to be 56 pixels. As such, corresponding relative measures will be of a greater magnitude, as discontinuity 307 occupies a much larger portion of localization region 801 than the entirety of IC structure 301. As another example, the relative measure may be determined as an aggregate of all discontinuities included as part of an IC structure or a localized region of the IC structure. Such relative measures may provide information associated with aggregated performance variations caused, at least in part, by the presence of multiple discontinuities included in an IC structure or as part of a localization region of the IC structure. Accordingly, the number of pixels associated with respective discontinuities may be aggregated in step 707, and corresponding relative measures will be of greater magnitude, as multiple discontinuities will occupy a much larger portion of the IC structure or the localization region. Image analysis results (e.g., determined relative measures) may be caused, at least in part, to be stored to, for instance, image analysis results repository 113, per step 607. The image analysis results may be stored in association with corresponding manufactured states of the IC structure, for example with at least one indicator relating to a stage (or step) in the manufacturing process that the imaging analysis results intend to characterize or otherwise relate.

Returning to FIG. 1, the image analysis results may be utilized to determine at 115 if modification is required. The determination may include, for example, comparing the relative measure of discontinuities with a predetermined threshold relative measure associated with yield and/or performance parameters, such as electrical performance parameters. A decision that modification is required may, for instance, occur if the relative measure of discontinuities is greater than the predetermined threshold. If modification is required, a decision may be made at 117 as to whether the manufacturing processes should be adjusted, or whether the design should be modified. Accordingly, the image analysis results may be provided to manufacturing optimization process 119 and/or design modification process 121 to enable one or more countermeasures to be implemented, so as to increase yield and/or performance of a semiconductor device including IC structures having discontinuities. Additionally, at step 115, if one or more relative measures violate the predetermined threshold, one or more corresponding alerts may be generated (not shown for illustrative convenience). The alerts may be utilized to facilitate the implementation of one or more countermeasures configured to avert the adverse consequences associated with discontinuities.

As previously described in association with FIGS. 2A and 2B, the fabrication of thin-film metal silicide, such as NiSi, may be carried out in multiple manufacturing steps, and each manufacturing step and/or completion of each manufacturing step may be associated with corresponding manufactured states. Images may be caused, at least in part, to be generated inline with these multiple manufacturing steps and states. For instance, an image may be caused, at least in part, to be generated in association with an initial heat treatment (e.g., annealing process) for initiating a chemical reaction between refractory metal atoms and silicon atoms in active areas of a semiconductor device, such as source/drain regions 207 and gate electrode 215 that are in contact with refractory metal layer 219. Then, during one or more subsequent iterations of imaging process 105, additional images may be caused, at least in part, to be generated. Generation of these additional images may be utilized to monitor and track the development of discontinuities, such as from the agglomeration of thin-film metal silicide. As such, subsequent image analysis processes 109 may be implemented. Exemplary development of one or more discontinuities is described in more detail in association with FIG. 9, whereas an exemplary process for monitoring the development of discontinuities in response to subsequent manufactured states of a semiconductor device is more fully described in association with FIG. 10.

Figure 9:
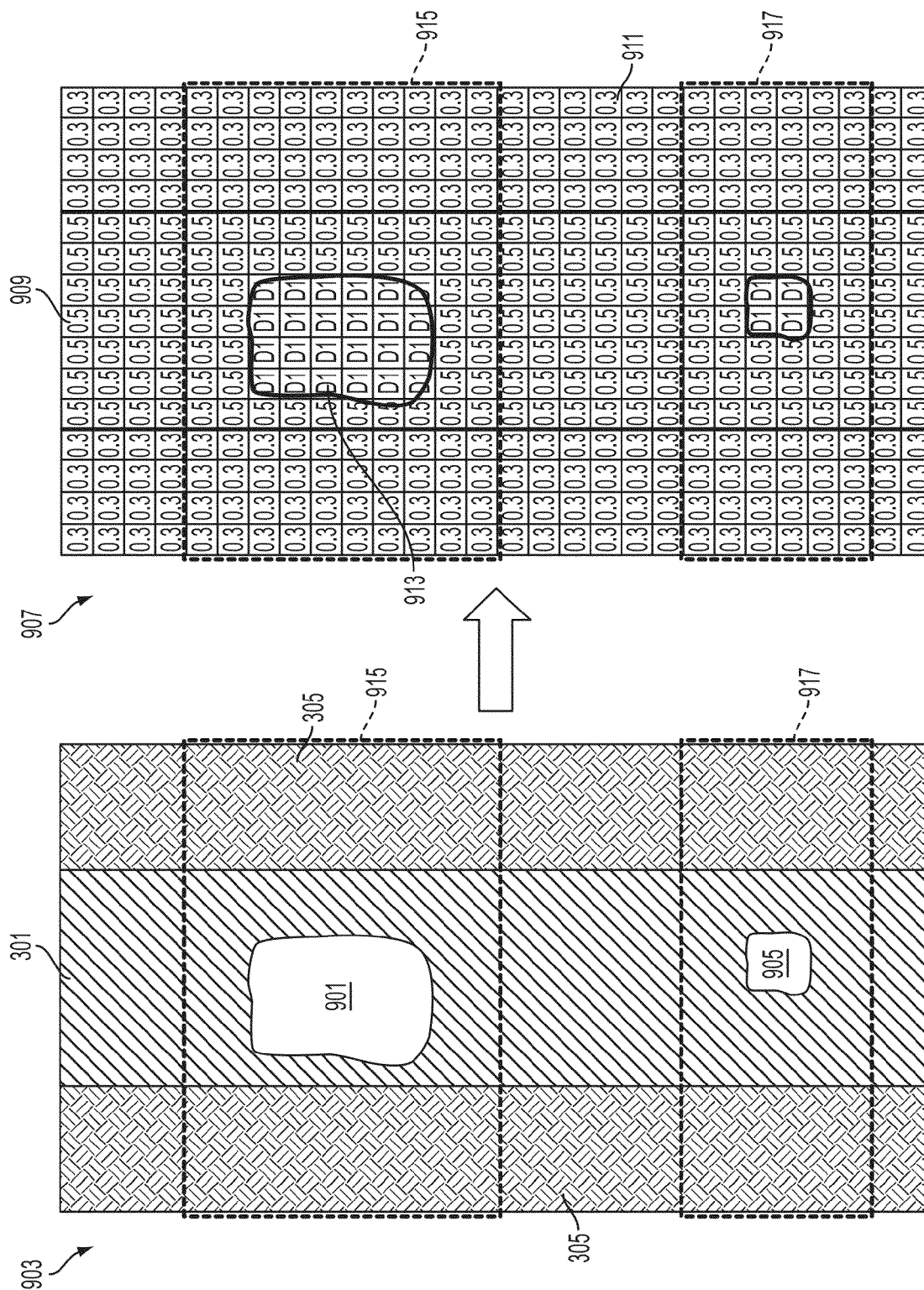
FIG. 9 schematically illustrates another image-based representation of at least one discontinuity at another manufactured state that may be utilized to facilitate another relative measure determination, according to an exemplary embodiment.

FIG. 9 schematically illustrates another image-based representation of at least one discontinuity at another manufactured state that may be utilized to facilitate another relative measure determination, according to an exemplary embodiment. As previously described, another image may be caused, at least in part, to be generated by, for example, imaging process 105 inline with a subsequent manufacturing process 101, since further exposure to one or more manufacturing stresses, such as additional heat treatment stresses, may cause existing discontinuities to further develop or new discontinuities to arise in an IC structure. For instance, discontinuity 307 included as part of IC structure 301 may be aggravated during subsequent heat treatment processes (or other manufacturing stresses) and may develop (e.g., grow) into discontinuity 901, as seen in SEM image 903. As another example, subsequent heat treatment processes (or other manufacturing stresses) may cause, at least in part, another discontinuity to develop, such as discontinuity 905. The growth of discontinuity 307 into discontinuity 901 and the development of discontinuity 905 may be captured by (or characterized in) pixelated matrix 907. As with pixelated matrix 501, vector-defined pixels like pixel 909 may relate to portions of SEM image 903 corresponding to at least a portion of an IC structure (e.g., IC structure 301), whereas vector-defined pixels like pixel 911 may relate to portions of SEM image 903 not corresponding to at least a portion of an IC structure, such as to substrate 305, and vector-defined pixels, such as pixel 913, may be utilized in conjunction with one or more other vector defined pixels to convey discontinuity 901 or 905 of IC structure 301. Further, one or more localization regions, such as localization regions 915 and 917, may be defined to facilitate relative measure determinations in relative proximity to discontinuities, such as discontinuities 901 and/or 905.

Figure 10:
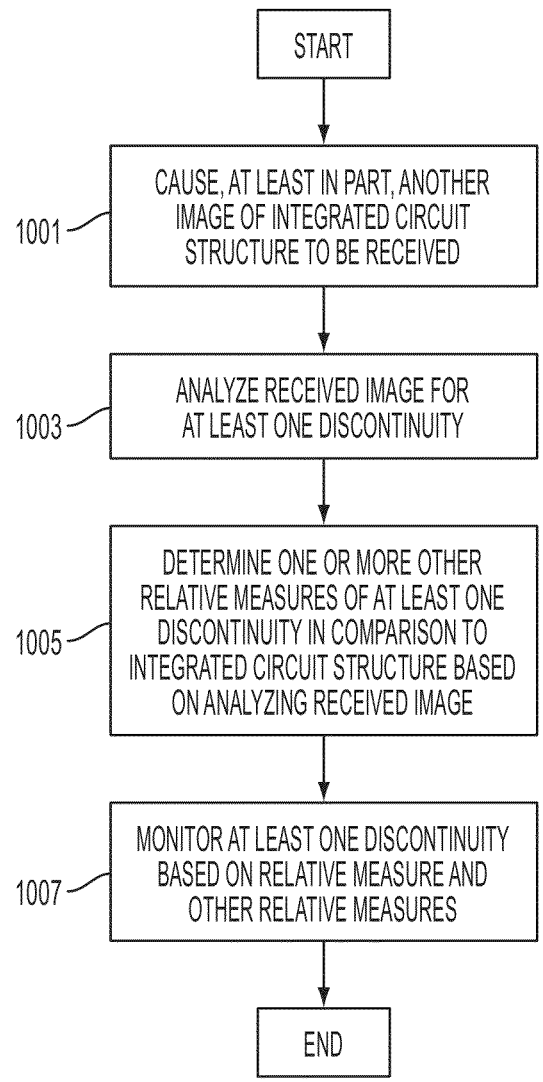
FIG. 10 is a flowchart of a process for monitoring the development of discontinuities in response to subsequent manufactured states of a semiconductor device, according to an exemplary embodiment.

FIG. 10 is a flowchart of a process for monitoring the development of discontinuities in response to subsequent manufactured states of a semiconductor device, according to an exemplary embodiment. For illustrative purposes, the process is described with reference to FIGS. 1 and 9. Further, the steps of the process may be performed in any suitable order, as well as combined or separated in any suitable manner. The process assumes that another (e.g., second) image has, at least in part, been generated, such as in a manner described in association with FIG. 4. In this manner, another image of an IC structure may be caused, at least in part, to be received, per step 1001. For instance, image analysis process 109 may be caused, at least in part, to receive a second image from, for example, images repository 107. The second image may have been generated in response one or more subsequent manufacturing steps or states.

The received image may be analyzed, in step 1003, for at least one discontinuity, for example in a manner consistent with that described in association with FIGS. 6 through 8. As such, a number of pixels may be determined in association with, for example, an IC structure including one or more discontinuities and a number of pixels associated with the corresponding one or more discontinuities. In the example of pixelated matrix 907, 196 pixels may be determined to relate to IC structure 301, 24 pixels may be determined to relate to discontinuity 901, and 4 pixels may be determined to relate to discontinuity 905. A number of pixels may also or alternatively be determined in association with one or more localization regions of an IC structure. Continuing with the example of pixelated matrix 907, 70 pixels may be determined to correspond to localization region 915 and 42 pixels may be determined to correspond to localization region 917. At step 1005, one or more other relative measures may be determined of at least one discontinuity in comparison with an IC structure based on analyzing the received image, for instance, based on corresponding associations between the number of pixels corresponding to an IC structure and the number of pixels relating to corresponding discontinuities included as part of the IC structure. Equation 1 may again be utilized for this purpose. Also, one or more other relative measures may be determined in relative proximity to corresponding discontinuities utilizing one or more corresponding localization regions, such as localization regions 915 and 917. Determined relative measures may be caused, at least in part, to be stored to, for instance, image analysis results repository 113, and the image analysis results may be stored in association with corresponding manufactured steps or states of the IC structure.

Image analysis process 109 may be configured to monitor the development of discontinuities based on the relative measure(s) determined in association with one or more previous manufacturing steps or states (e.g., in association with FIGS. 6 through 8) and the relative measure(s) determined in association with one or more subsequent manufacturing steps or states. This may be achieved based on monitoring the relative magnitudes of corresponding relative measures. In addition, image analysis process 109 may be configured to determine relative measure distributions of discontinuities across all or a portion of a semiconductor device or an IC structure and to monitor changes in the distributions of discontinuities. The data may in turn be used to monitor thin film layer degradation due to temperature and/or stress impacts. Again, manufacturing optimization process 119 and/or design modification process 121 may be implemented to avert the adverse consequences of design verification violation discontinuities or ensure that future semiconductor devices are not fabricated with such discontinuities. If no significant discontinuities exist, the semiconductor device may proceed to a next manufacturing process step.

Figure 11:
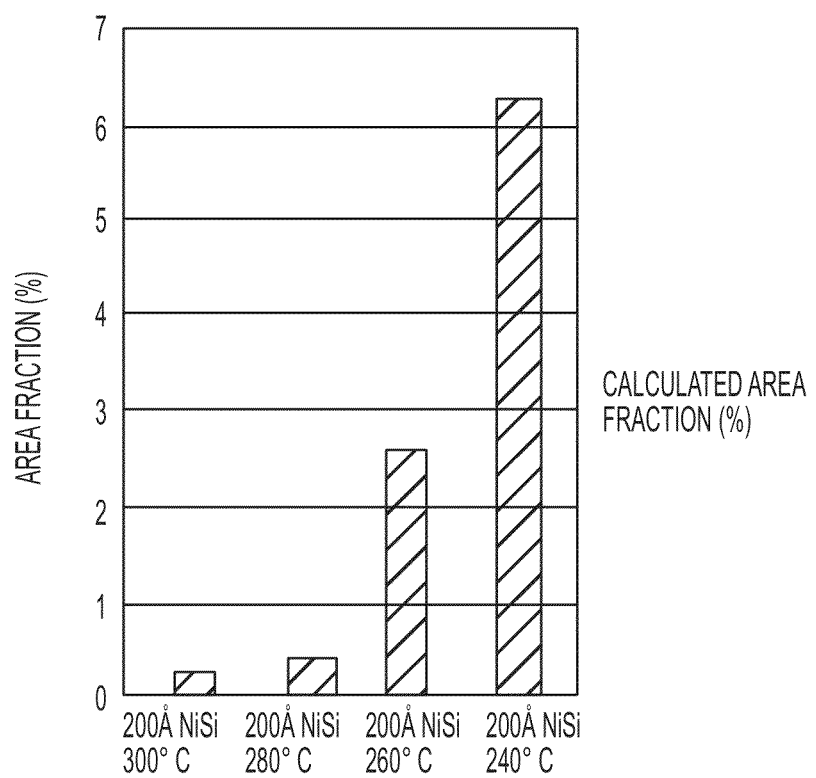
FIG. 11 schematically illustrates a correlation between the area fraction of discontinuities and the temperature of heat treatment, according to an exemplary embodiment.

FIG. 11 schematically illustrates a correlation between the area fraction of discontinuities and the temperature of heat treatment for a given thickness of NiSi, according to an exemplary embodiment. As indicated, for a 200 angstrom (Å) thick layer of NiSi, the area fraction of discontinuities is relatively low at processing temperatures of 300° C. and 280° C. However, the area fraction increases dramatically as the temperature is further lowered to 260° C., and even more so at 240° C. Accordingly, for a given thickness of NiSi, a manufacturing optimization process 119 may include raising the anneal temperature or temperature of later processing steps.

Figure 12:
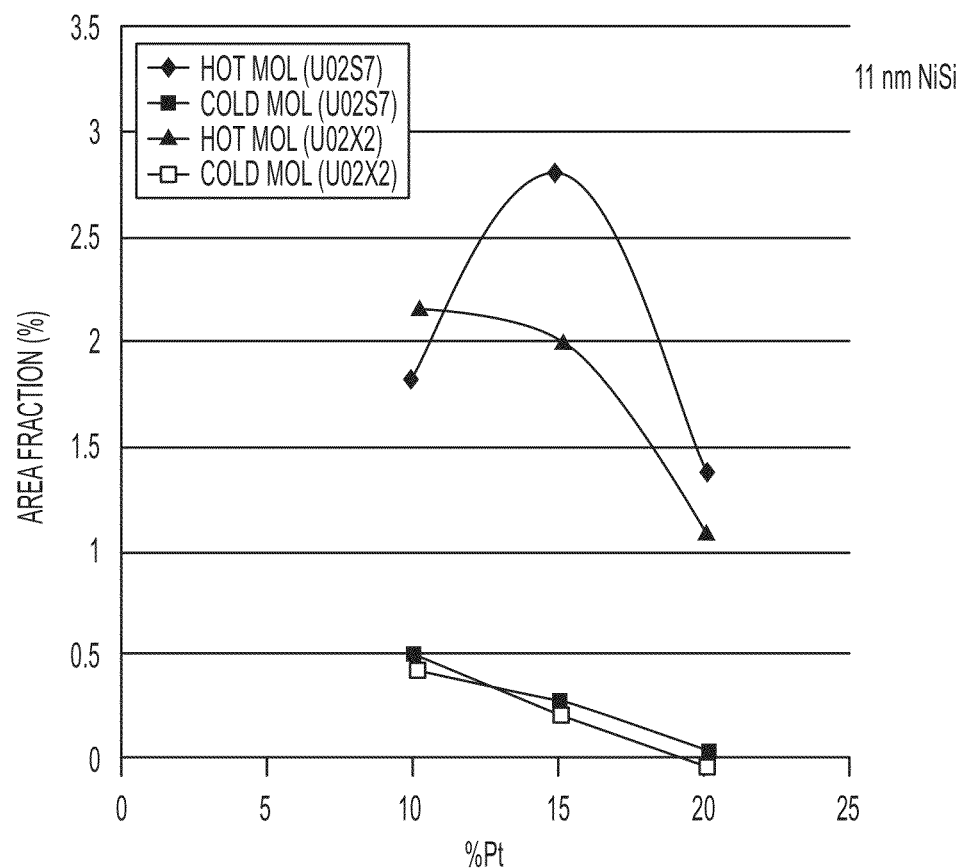
FIG. 12 schematically illustrates a correlation between the area fraction of discontinuities and platinum content of silicide before heat treatment, according to an exemplary embodiment.

As previously mentioned, NiSi may contain some platinum to improve its material and electrical properties. FIG. 12 schematically illustrates a correlation between the area fraction of discontinuities and platinum content of silicide during MOL processes, according to an exemplary embodiment. As shown, for hot MOL processes (e.g., 450° C.), the area fraction of an 11 nanometer (nm) thick film of NiSi either increases to 2.7% or remains relatively constant around 2.2%, between 10 and 15% platinum content, but decreases dramatically by at least 2% as the platinum content is further increased between 15 and 20%. On the other hand, for cold MOL processes (e.g., 400° C.), the area fraction for the same layer of NiSi decreases a total of about 0.5% at a fairly constant rate between 10% and 20% platinum content. Therefore, for discontinuities discovered during MOL processes, a design modification process may include an increase in platinum content.

Figure 13:
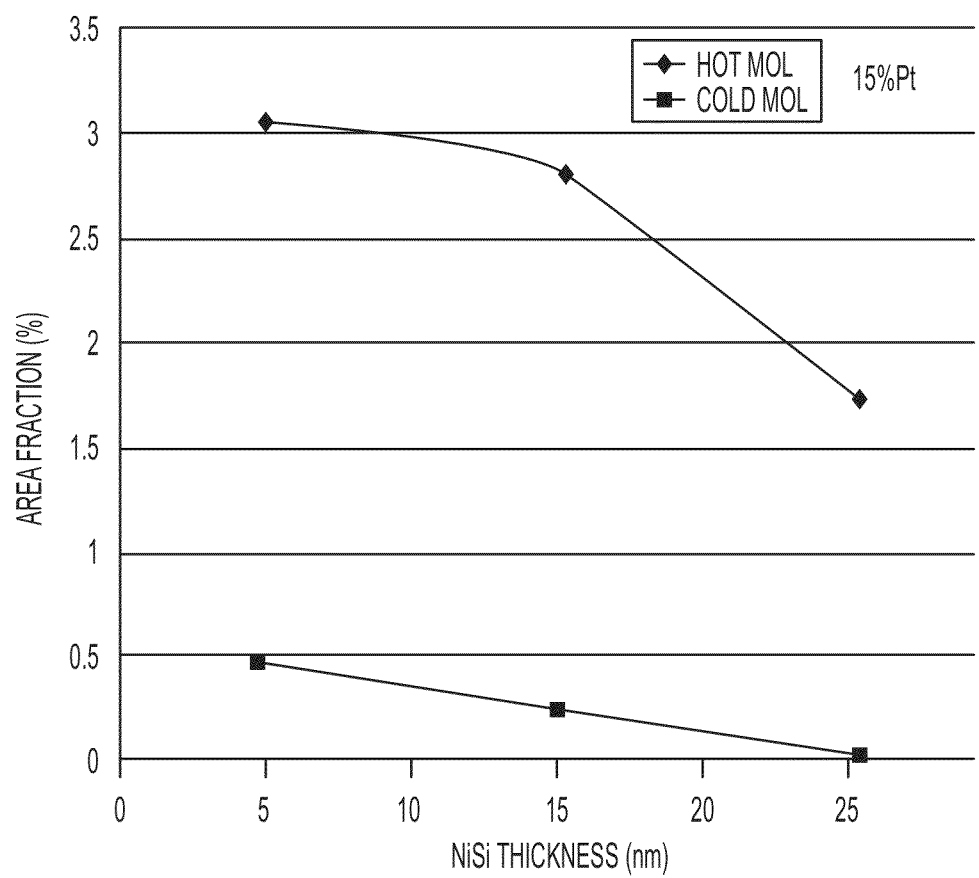
FIG. 13 schematically illustrates a correlation between the area fraction of discontinuities and metal silicide thickness, according to an exemplary embodiment.

FIG. 13 schematically illustrates a correlation between the area fraction of discontinuities and metal silicide thickness for a given platinum content, according to an exemplary embodiment. As shown, for cold MOL processes (e.g., 400° C.), the area fraction gradually decreases from just under 0.5% to almost 0% from a thickness of 10 nm to 12 nm. For hot MOL processes (e.g., 450° C.), the area fraction decreases gradually from 3% to 2.8% between 10 nm and 11 nm and then drops to 1.75% as the thickness is increased to 12 nm. In other words, particularly for hot MOL processes, an increase in the thickness of the NiSi may be included as a design modification process.

The image analysis results may also be used to determine correlations between the resistivity of the resulting metal silicide and the area fraction of discontinuities. From the determined calculations, appropriate countermeasures may be developed.

Figure 14:
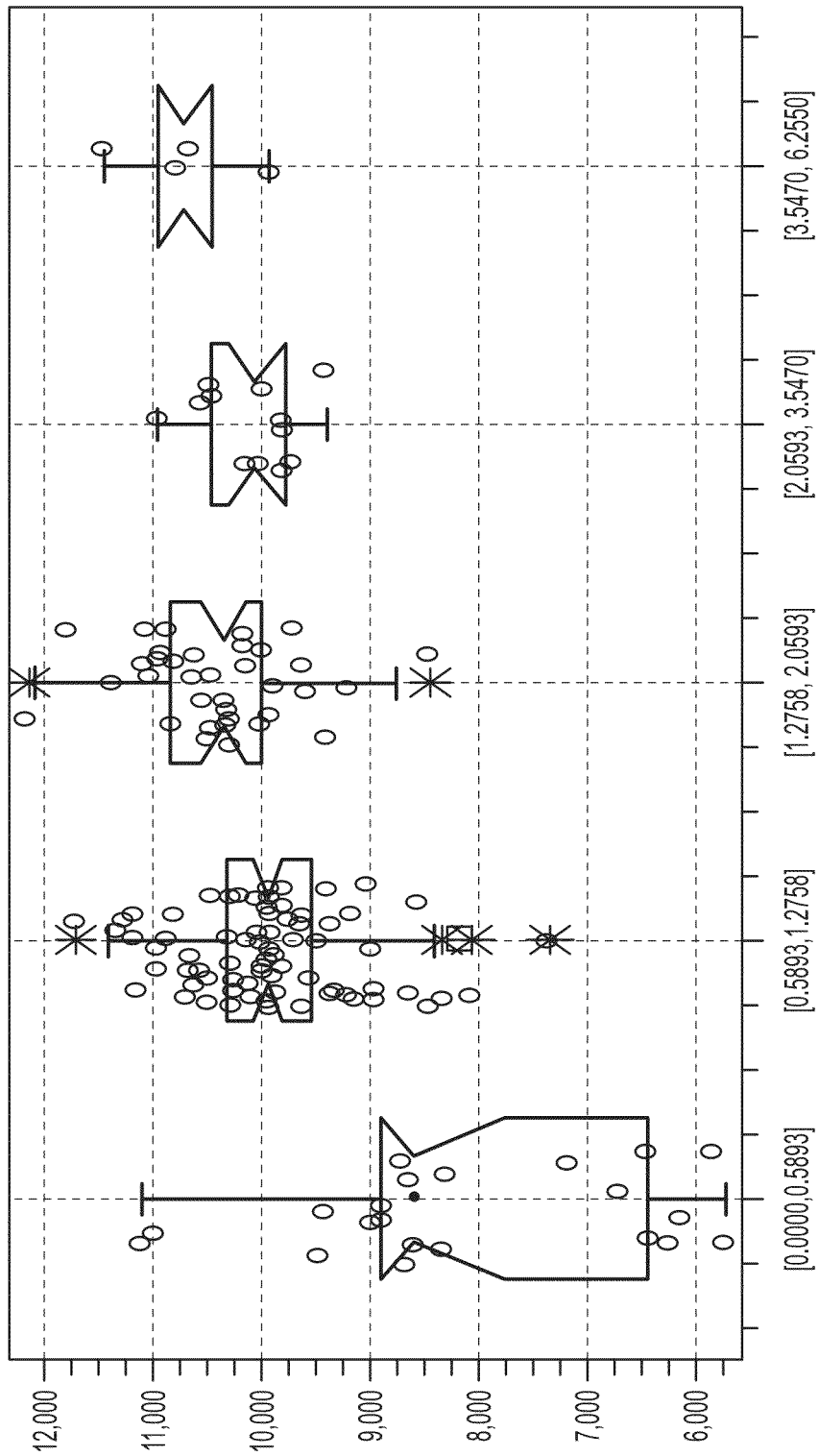
FIG. 14 schematically illustrates a correlation between the area fraction of discontinuities and the resistivity of resulting metal silicide structures, according to an exemplary embodiment.

FIG. 14 schematically illustrates a correlation between the area fraction of discontinuities and the resistivity of resulting metal silicide structures, according to an exemplary embodiment. As shown, the resistance of silicide lines is improved (or lowered) with decreasing hole area fraction. From the determined calculations, appropriate countermeasures may be developed.

Figure 15:
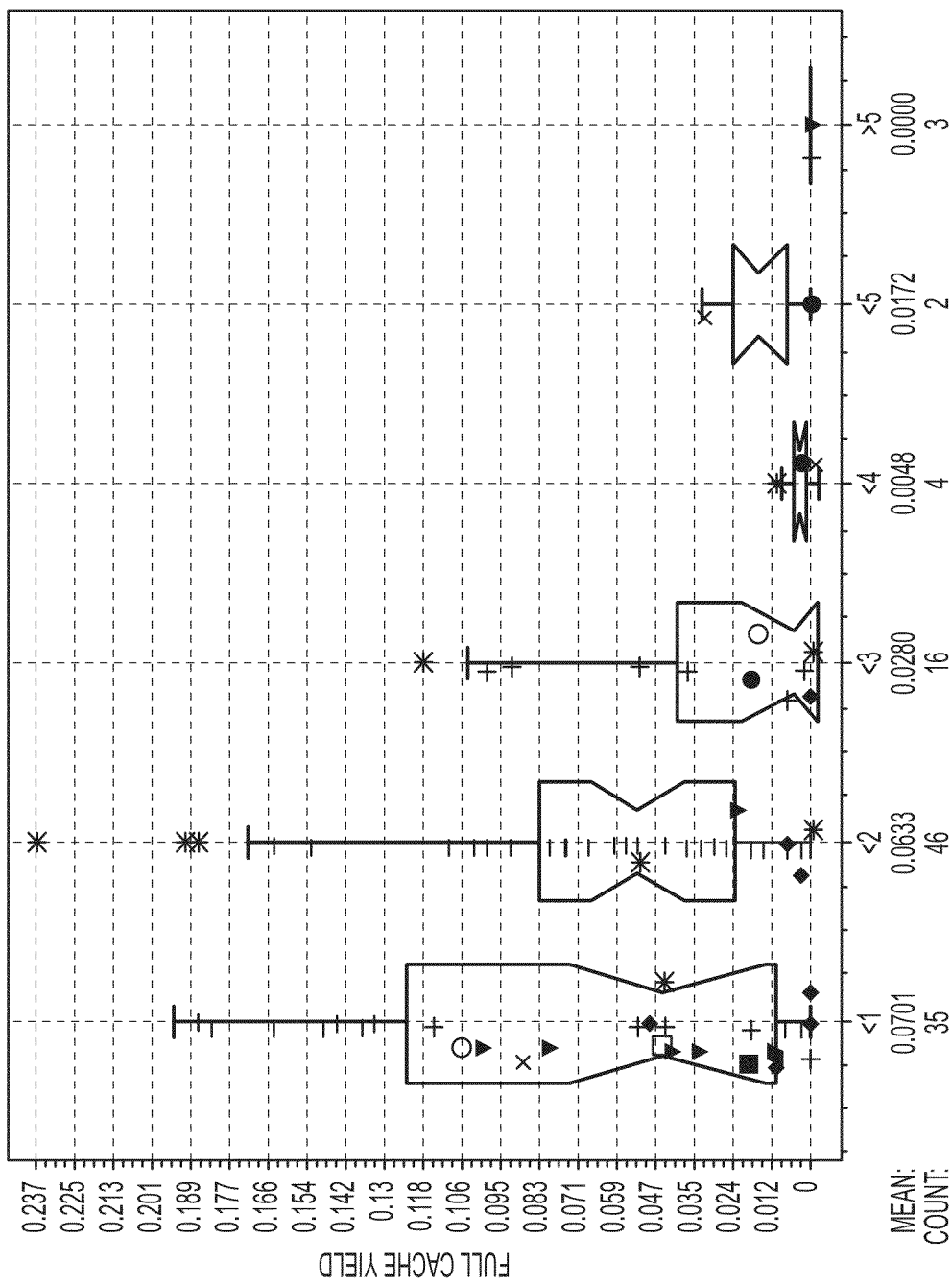
FIG. 15 schematically illustrates a correlation between the area fraction of discontinuities and yield of resulting semiconductor devices, according to an exemplary embodiment.

FIG. 15 schematically illustrates a correlation between the area fraction of discontinuities and yield of resulting semiconductor devices, according to an exemplary embodiment.

As shown, there is a clear yield improvement with reduced NiSi hole area fraction, as derived from an exemplary embodiment. From the determined calculations, appropriate countermeasures may be developed.

Figure 16:
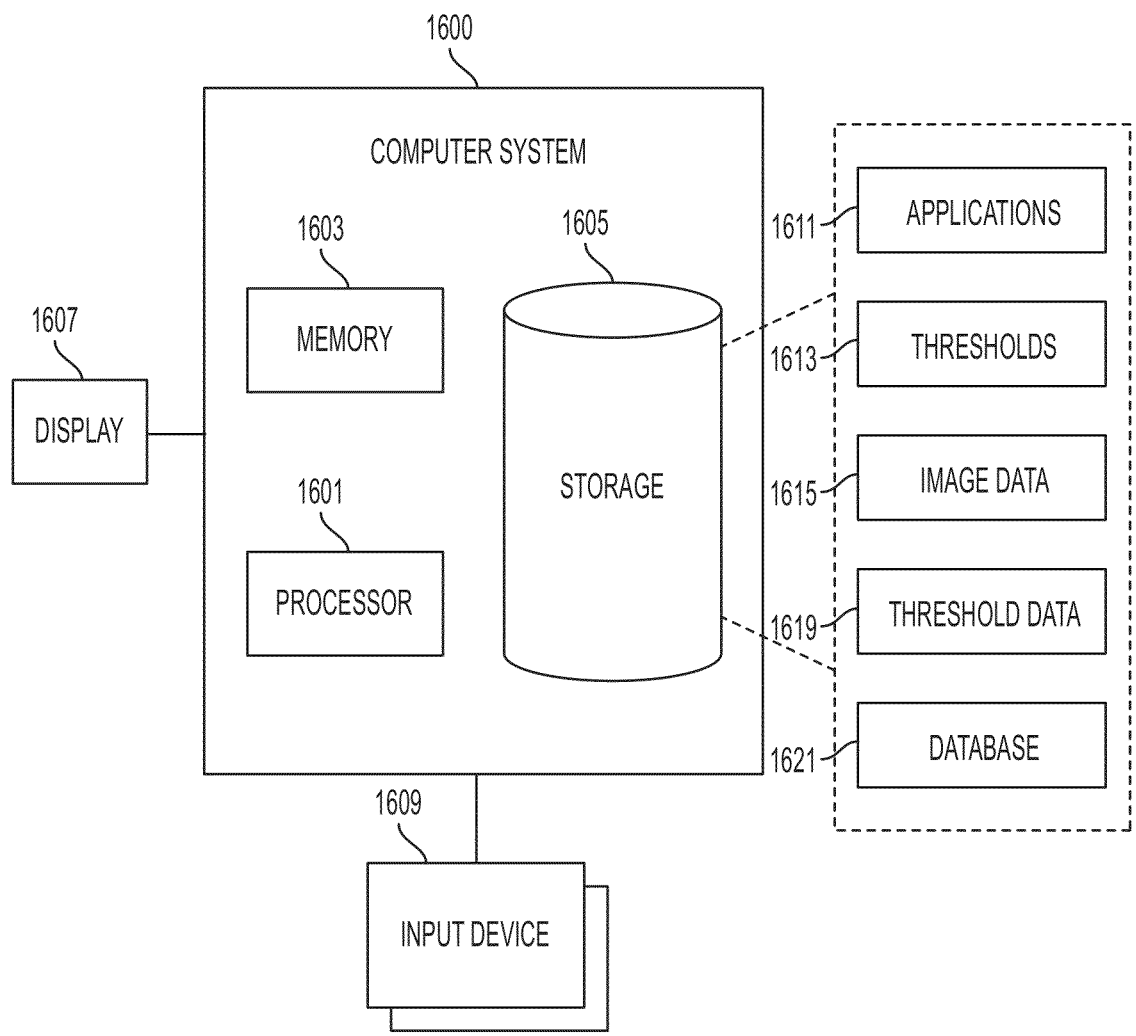
FIG. 16 schematically illustrates a computer system, according to an exemplary embodiment.

The processes described herein may be implemented via software, hardware, firmware, or a combination thereof. Exemplary hardware (e.g., computing hardware) is schematically illustrated in FIG. 16. As shown, computer system 1600 includes at least one processor 1601, at least one memory 1603, and at least one storage 1605. Computer system 1600 may be coupled to display 1607 and one or more input devices 1609, such as a keyboard and a pointing device. Display 1607 may be utilized to provide one or more GUI interfaces. Input devices 1609 may be utilized by users of computer system 1600 to interact with, for instance, the GUI interfaces. Storage 1605 may store applications 1611, thresholds 1613, image data 1615, threshold data 1619, and at least one database (or repository) 1621. Applications 1611 may include instructions (or computer program code) that when executed by processor 1601 cause computer system 1600 to perform one or more processes, such as one or more of the processes described herein. In exemplary embodiments, applications 1611 may include one or more EDA tools, such as one or more imaging tools, which may be utilized to generate one or more images of semiconductor devices inline with one or more manufacturing processes. According to other embodiments, applications 1611 may include one or more EDA tools, such as one or more image analysis tools, which may be utilized to identify, characterize, and monitor discontinuities. In other embodiments, applications 1611 may include or more EDA tools, which may rework and/or modify semiconductor designs, processes, to avert the adverse consequences associated with discontinuities or at least ensure that future semiconductor devices are not fabricated with such discontinuities.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
    causing, at least in part, an image of an integrated circuit structure of a plurality of integrated circuit structures included as part of an integrated circuit device to be received;
    analyzing the image for at least one discontinuity in the integrated circuit structure;
    determining a relative measure of the at least one discontinuity in comparison to the integrated circuit structure based on analyzing the image;
    analyzing the relative measure in conjunction with a plurality of other relative measures associated with the integrated circuit device to determine a relative measure distribution across the integrated circuit device;
    monitoring for changes to the relative measure distribution across the integrated circuit device between manufacturing process steps;
    determining whether the relative measure violates a predetermined threshold; and
    generating an alert when the relative measure violates the predetermined threshold to facilitate implementation of one or more countermeasures configured to avert adverse consequences associated with the at least one discontinuity.

2. The method according to claim 1, further comprising:
    causing, at least in part, the image to be generated inline with one or more manufacturing processes utilized to fabricate at least a portion of the integrated circuit structure.

3. The method according to claim 2, wherein causing, at least in part, the image to be generated includes:
    causing, at least in part, the integrated circuit structure to be imaged with a scanning electron microscope.

4. The method according to claim 1, further comprising:
    pixelating the image with a plurality of pixels,
    determining a number of pixels associated with the integrated circuit structure; and
    determining a number of pixels associated with the at least one discontinuity,
    wherein the relative measure includes a fractional comparison between the number of pixels associated with the at least one discontinuity and the number of pixels associated with the integrated circuit structure.

5. The method according to claim 4, wherein the plurality of pixels are vector-defined based on one or more monochromatic or grayscale thresholds.

6. The method according to claim 1, further comprising:
    determining whether the relative measure violates at least one design threshold associated with yield and/or electrical performance; and
    generating the alert if the relative measure violates at least one of the at least one design threshold,
    wherein the integrated circuit structure includes a thin-film silicide, and
    wherein the at least one discontinuity is caused by agglomeration of the thin-film silicide.

7. The method according to claim 1, further comprising:
    causing, at least in part, a second image of the integrated circuit structure to be received;
    analyzing the second image for at least the at least one discontinuity;
    determining a second relative measure of the at least one discontinuity in comparison to the integrated circuit structure based on analyzing the second image; and
    monitoring the at least one discontinuity based on the relative measure and the second relative measure.

8. The method according to claim 7, wherein the image and the second image are respectively associated with a manufactured state and a second manufactured state of the integrated circuit structure, the method further comprising:
    causing, at least in part, the image and the second image to be respectively stored in association with the manufactured state and the second manufactured state.

9. An apparatus comprising:
    at least one processor; and
    at least one memory including computer program code, the at least one memory and the computer program code configured to, with the at least one processor, cause the apparatus at least to:
    receive an image of an integrated circuit structure of a plurality of integrated circuit structures included as part of an integrated circuit device;
    analyze the image for at least one discontinuity in the integrated circuit structure;

determine a relative measure of the at least one discontinuity in comparison to the integrated circuit structure based on analyzing the image;

analyze the relative measure in conjunction with a plurality of other relative measures associated with the integrated circuit device to determine a relative measure distribution across the integrated circuit device;

monitor for changes to the relative measure distribution across the integrated circuit device between manufacturing process steps;

determine whether the relative measure violates a predetermined threshold; and generate an alert when the relative measure violates the predetermined threshold to facilitate implementation of one or more countermeasures configured to avert adverse consequences associated with the at least one discontinuity.

10. The apparatus according to claim 9, wherein the apparatus is at least further caused to:

cause, at least in part, the image to be generated inline with one or more manufacturing processes utilized to fabricate at least a portion of the integrated circuit structure.

11. The apparatus according to claim 10, wherein the apparatus is at least further caused to:

cause, at least in part, the integrated circuit structure to be imaged with a scanning electron microscope.

12. The apparatus according to claim 9, wherein the apparatus is at least further caused to:

pixelate the image with a plurality of pixels;

determine a number of pixels associated with the integrated circuit structure; and determine a number of pixels associated with the at least one discontinuity, wherein the relative measure includes a fractional comparison between the number of pixels associated with the at least one discontinuity and the number of pixels associated with the integrated circuit structure.

13. The apparatus according to claim 12, wherein the plurality of pixels are vector-defined based on one or more monochromatic or grayscale thresholds.

14. The apparatus according to claim 9, wherein the apparatus is at least further caused to:

determine whether the relative measure violates at least one design threshold associated with yield and/or electrical performance; and generate the alert if the relative measure violates at least one of the at least one design threshold, wherein the integrated circuit structure includes a thin-film silicide, and wherein the at least one discontinuity is caused by agglomeration of the thin-film silicide.

15. The apparatus according to claim 9, wherein the apparatus is at least further caused to:

receive a second image of the integrated circuit structure;

analyze the second image for at least the at least one discontinuity;

determine a second relative measure of the at least one discontinuity in comparison to the integrated circuit structure based on analyzing the second image; and monitor the at least one discontinuity based on the relative measure and the second relative measure.

16. The apparatus according to claim 15, wherein the image and the second image are respectively associated with a manufactured state and a second manufactured state of the integrated circuit structure, the apparatus being at least further caused to:

store the image and the second image in respective association with the manufactured state and the second manufactured state.

17. A method comprising:

causing, at least in part, a plurality of images of an integrated circuit structure of a plurality of integrated circuit structures included as part of an integrated circuit device to be received, the plurality of images being respectively associated with a plurality of manufactured states of the integrated circuit structure;

analyzing the plurality of images for at least one discontinuity in the integrated circuit structure;

determining a plurality of relative measures of the at least one discontinuity in comparison to the integrated circuit structure based on analyzing the plurality of images;

analyzing the plurality of relative measures in conjunction with a plurality of other relative measures associated with the integrated circuit device to determine a relative measure distribution across the integrated circuit device;

monitoring for changes to the relative measure distribution across the integrated circuit device between manufacturing process steps;

determining whether the plurality of relative measures violates a predetermined threshold; and generating an alert when at least one of the plurality of relative measures violates the predetermined threshold to facilitate implementation of one or more countermeasures configured to avert adverse consequences associated with the at least one discontinuity.

18. The method according to claim 17, further comprising:

determining whether any of the plurality of relative measures violates at least one design threshold associated with yield and/or electrical performance; and generating the alert if at least one of the plurality of relative measures violates at least one of the at least one design threshold, wherein the integrated circuit structure includes a thin-film silicide, and wherein the at least one discontinuity is caused by agglomeration of the thin-film silicide.

* * * * *